(12) United States Patent
Hu et al.

(10) Patent No.: US 12,341,742 B2
(45) Date of Patent: Jun. 24, 2025

(54) INFORMATION DISPLAY METHOD, APPARATUS, AND ELECTRONIC DEVICE

(71) Applicant: Beijing Zitiao Network Technology Co., Ltd., Beijing (CN)

(72) Inventors: Junxiao Hu, Beijing (CN); Zhaoyuan Peng, Beijing (CN); Bowen Shen, Beijing (CN); Hongze Liu, Beijing (CN); Lei Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/516,776

(22) Filed: Nov. 21, 2023

(65) Prior Publication Data

US 2024/0089228 A1 Mar. 14, 2024

Related U.S. Application Data

(63) Continuation of application No. PCT/CN2022/100886, filed on Jun. 23, 2022.

(30) Foreign Application Priority Data

Jun. 25, 2021 (CN) .......................... 202110716204.5

(51) Int. Cl.
*G06F 15/16* (2006.01)
*H04L 51/216* (2022.01)
*H04L 51/226* (2022.01)

(52) U.S. Cl.
CPC .......... *H04L 51/216* (2022.05); *H04L 51/226* (2022.05)

(58) Field of Classification Search
CPC ........................... H04L 51/216; H04L 51/226
(Continued)

(56) References Cited

U.S. PATENT DOCUMENTS 8,543,655 B1 * 9/2013 Smith ................ H04L 51/212
                                                     709/206
2005/0262199 A1 * 11/2005 Chen ..................... H04L 51/04
                                                     709/204
(Continued)

FOREIGN PATENT DOCUMENTS

CN      105120065 A      12/2015
CN      105827501 A      8/2016
(Continued)

OTHER PUBLICATIONS

Aamoth, Doug. "Gmail Tips: Get Organized with Labels and Filters". Oct. 6, 2014. Time. pp. 1-7. (Year: 2014).*
(Continued)

Primary Examiner — Imad Hussain
(74) Attorney, Agent, or Firm — Astute IP Law Group

(57) ABSTRACT

Embodiments of the disclosure disclose a method, apparatus and electronic device for information display. The method comprises: displaying at least two session filtering identifiers, a session corresponding to each session filtering identifier satisfying a filtering condition corresponding to the session filtering identifier; displaying information of respective sessions corresponding to a first filtering identifier in a preset display area of a message page, the first filtering identifier being a currently selected filtering identifier; in response to a message of a session corresponding to a second filtering identifier satisfying a preset condition, displaying information of the session in the preset display area, the second filtering identifier being other filtering identifier than the first filtering identifier. The method makes it possible that a message satisfying the preset condition under a filtering identifier which is not selected currently can be displayed in time.

20 Claims, 4 Drawing Sheets

---

DISPLAY AT LEAST TWO SESSION FILTERING IDENTIFIERS, A SESSION CORRESPONDING TO EACH SESSION FILTERING IDENTIFIER SATISFYING A FILTERING CONDITION CORRESPONDING TO THE SESSION FILTERING IDENTIFIER — 101

DISPLAY INFORMATION OF RESPECTIVE SESSIONS CORRESPONDING TO A FIRST FILTERING IDENTIFIER IN A PRESET DISPLAY AREA OF A MESSAGE PAGE, THE FIRST FILTERING IDENTIFIER BEING A CURRENTLY SELECTED FILTERING IDENTIFIER — 102

IN RESPONSE TO A MESSAGE OF A SESSION CORRESPONDING TO A SECOND FILTERING IDENTIFIER SATISFYING A PRESET CONDITION, DISPLAY INFORMATION OF THE SESSION IN THE PRESET DISPLAY AREA, THE SECOND FILTERING IDENTIFIER BEING OTHER FILTERING IDENTIFIER THAN THE FIRST FILTERING IDENTIFIER — 103

(58) Field of Classification Search
USPC .......................................................... 709/206
See application file for complete search history.

(56) References Cited

U.S. PATENT DOCUMENTS

| | | | |
|---|---|---|---|
| 2006/0031361 A1* | 2/2006 | Bailey | H04L 51/04 707/999.2 |
| 2007/0174407 A1 | 7/2007 | Chen et al. | |
| 2008/0109739 A1 | 5/2008 | Khan | |
| 2010/0082759 A1 | 4/2010 | Nalliah et al. | |
| 2013/0212490 A1 | 8/2013 | Scherpa | |
| 2015/0222572 A1 | 8/2015 | Vendrow et al. | |
| 2016/0380937 A1* | 12/2016 | Murphy | H04L 9/08 709/206 |
| 2017/0017638 A1* | 1/2017 | Satyavarta | G06F 40/253 |
| 2017/0075952 A1* | 3/2017 | Hartwell | G06F 16/33 |
| 2017/0134316 A1* | 5/2017 | Cohen | H04L 51/216 |
| 2020/0272324 A1 | 8/2020 | Chanda et al. | |
| 2021/0110440 A1 | 4/2021 | Dion et al. | |
| 2021/0382562 A1 | 12/2021 | Hassan | |
| 2023/0132663 A1* | 5/2023 | Rhee | H04L 51/046 709/206 |

FOREIGN PATENT DOCUMENTS

| | | |
|---|---|---|
| CN | 106575396 A | 4/2017 |
| CN | 106775268 A | 5/2017 |
| CN | 102685028 B | 1/2018 |
| CN | 107533417 A | 1/2018 |
| CN | 108632127 A | 10/2018 |
| CN | 109039862 A | 12/2018 |
| CN | 109086117 A | 12/2018 |
| CN | 109697100 A | 4/2019 |
| CN | 110032417 A | 7/2019 |
| CN | 110046013 A | 7/2019 |
| CN | 105227444 B | 8/2019 |
| CN | 110138652 A | 8/2019 |
| CN | 111158831 A | 5/2020 |
| CN | 111277637 A | 6/2020 |
| CN | 111309937 A | 6/2020 |
| CN | 108289079 B | 7/2020 |
| CN | 111756615 A | 10/2020 |
| CN | 112099700 A | 12/2020 |
| CN | 112947823 A | 6/2021 |
| CN | 114461313 A | 5/2022 |
| CN | 114461314 A | 5/2022 |
| JP | 2017211968 A | 11/2017 |

OTHER PUBLICATIONS

Raphael, JR. "How to use Gmail labels to tame your inbox". Nov. 2019/Apr. 2023. IDG. pp. 1-8. (Year: 2023).*
Nowakowski, Maciek and DiBello, Bruce. "Official Gmail Blog." Oct. 26, 2010/Aug. 4, 2011 (Year: 2011).*
Stack Exchange. "Searching within Gmail's nested labels". 2016. p. 1. (Year: 2016).*
Google. "Search operators you can use with Gmail". 2019. pp. 1-4. (Year: 2019).*
International Search Report in PCT/CN2022/100886, mailed Aug. 31, 2022, 3 pages.
International Search Report and Written Opinion received for PCT Patent Application No. PCT/CN2022/100746, mailed on Aug. 4, 2022, 14 pages.
Second Office Action received for Chinese Patent Application No. 202110716551.8, mailed on Dec. 29, 2023, 16 pages.
Non-Final Office Action for U.S. Appl. No. 18/526,835, mailed on Nov. 14, 2024, 19 pages.
Notification to Grant Patent Right for Invention for Chinese Patent Application No. 202110716551.8, mailed on May 28, 2024, 6 pages.
Office Action for Chinese Patent Application No. 202110716204.5, mailed on Mar. 1, 2023, 11 pages.
First Office Action for Chinese Patent Application No. 202110716551.8, mailed on Mar. 23, 2023, 14 Pages.
Written Opinion for International Application No. PCT/CN2022/100886, mailed Aug. 31, 2022, 9 Pages.
Office Action for Japanese Patent Application No. 2023-572543, mailed on Dec. 17, 2024, 18 pages.
Office Action for U.S. Appl. No. 18/526,835, mailed on Mar. 3, 2025, 27 pages.

* cited by examiner

INFORMATION DISPLAY METHOD, APPARATUS, AND ELECTRONIC DEVICE

CROSS-REFERENCE TO RELATED APPLICATIONS

The present application is a Continuation Applications of International Patent Application No. PCT/CN2022/100886, filed Jun. 23, 2022, which claims priority to Chinese Patent Application No. 202110716204.5, filed on Jun. 25, 2021 and entitled "INFORMATION DISPLAY METHOD, APPARATUS, AND ELECTRONIC DEVICE", the entireties of which are incorporated herein by reference.

FIELD

The present disclosure relates to the field of the Internet technologies, in particular to a method and apparatus for information display, and an electronic device.

BACKGROUND

With the development of Internet technology, users may communicate with others in real time. For example, users may communicate with their contacts in real time through instant messaging applications.

When a user communicates with a contact, a session between the user and the contact is obtained. Information about different sessions may be displayed in a message page of a user terminal.

SUMMARY

This Summary is provided to introduce concepts in a simplified form that are further described below in the Detailed Description. This Summary is not intended to identify key features or essential features of the technical solution as defined, nor is it intended to be used to limit the scope thereof.

The embodiments of the present disclosure provide a method for information display, apparatus and electronic device.

In a first aspect, embodiments of the present disclosure provide a method for information display, comprising: displaying at least two session filtering identifiers, a session corresponding to each session filtering identifier satisfying a filtering condition corresponding to the session filtering identifier; displaying information of respective sessions corresponding to a first filtering identifier in a preset display area of a message page, the first filtering identifier being a currently selected filtering identifier; and in response to a message of a session corresponding to a second filtering identifier satisfying a preset condition, displaying information of the session in the preset display area, the second filtering identifier being other filtering identifier than the first filtering identifier.

In a second aspect, embodiments of the present disclosure provide an apparatus for information display, comprising: a first display unit configured to display at least two session filtering identifiers, a session corresponding to each session filtering identifier satisfying a filtering condition corresponding to the session filtering identifier; a second display unit configured to display information of respective sessions corresponding to a first filtering identifier in a preset display area of a message page, the first filtering identifier being a currently selected filtering identifier; and a third display unit configured to display, in response to a message of a session corresponding to a second filtering identifier satisfying a preset condition, information of the session in the preset display area, the second filtering identifier being other filtering identifier than the first filtering identifier.

In a third aspect, embodiments of the present disclosure provide an electronic device, which comprises: one or more processors, a memory device for storing one or more programs which, when executed by the one or more processors, cause the one or more processors to implement the method for information display as described in the first aspect.

In a fourth aspect, embodiments of the present disclosure provide a computer readable storage medium which has a computer program stored thereon. The computer, when executed by a processor, performs the steps of the method for information display as described in the first aspect.

With the method, apparatus and electronic device for information display provided by the embodiments of the present disclosure, at least two session filtering identifiers are displayed, a session corresponding to each session filtering identifier satisfying a filtering condition corresponding to the session filtering identifier; information of respective sessions corresponding to a first filtering identifier is displayed in a preset display area of a message page, the first filtering identifier being a currently selected filtering identifier; and in response to a message of a session corresponding to a second filtering identifier satisfying a preset condition, information of the session is displayed in the preset display area, the second filtering identifier being other filtering identifier than the first filtering identifier. In this way, it can achieves transparent transmission of a message satisfying the preset condition between different filtering identifiers. In a scenario where sessions are grouped according to different filtering conditions and a session corresponding to a selected session is displayed in the message display page, the solution makes it possible that a message satisfying the preset condition under a filtering identifier which is not selected currently can be displayed in time. Moreover, it may be avoided that processing of important messages are delayed due to information of sessions under other filtering identifiers not checked in time.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that the concepts of "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are examples but not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

Figure 1:
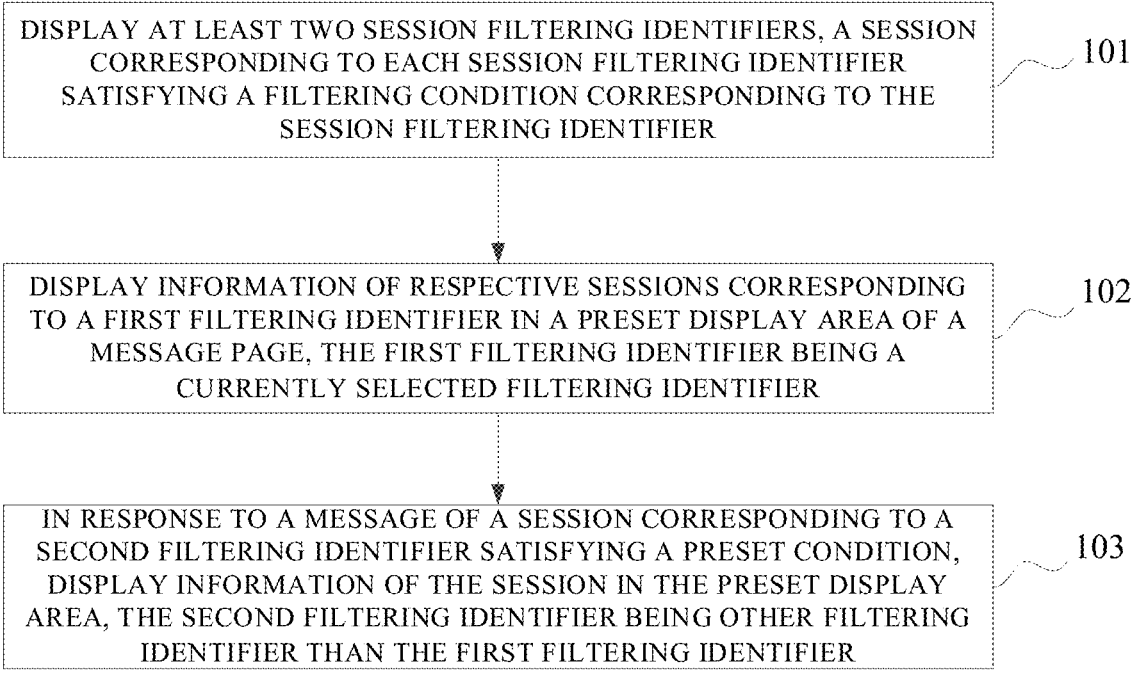
FIG. 1 is a flowchart of a method for information display according to some embodiments of the present disclosure.

Reference is made to FIG. 1, which shows a flow of a method for information display in accordance with some embodiments of the present disclosure. As illustrated, the method for information display comprises the following steps.

At step 101, at least two session filtering identifiers are displayed. A session corresponding to each session filtering identifier meets a filtering condition corresponding to the session filtering identifier.

At step 102, information of respective sessions corresponding to a first filtering identifier is displayed in a preset display area of a message page, the first filtering identifier being a currently selected filtering identifier.

The message page here may be a message page of an instant messaging client or a message page displayed in a web page.

The displaying at least two session filtering identifiers comprises: displaying at least two session filtering identifiers in the first display area of the message page. The preset display area may be a second display area of the message page.

In some application scenarios, the first display area and the second display area are located in a same message page. For example, the first display area is at the top of a message page, and the second display area is below the first display area in the message page.

In other application scenarios, the first display area and the second display area are located in different message pages.

In these application scenarios, the first display area may be located in a first message page, and the second display area may be located in a second message page. The first message page and the second message page may be simultaneously displayed in a display page. Also the first message page and the second message page may be displayed in the display page at different times. For example, the first message page may be displayed first. When the user triggers a session filtering identifier in the first display area, the triggered filtering identifier is used as the first filtering identifier. The second message page may be displayed in the display page, and information of respective sessions corresponding to the first filtering identifier may be displayed in the second message page. The information of the respective sessions corresponding to one filtering identifier will be arranged in a certain order.

The filtering condition, for example, may include, but is not limited to, one or more of the following: all incoming new messages are notified in real time, all incoming new messages are not notified in real time, and messages are not processed, etc.

In some embodiments of the present disclosure, notifying in real time may specifically be one or more of the following: a message notification pops up upon receipt of a new message; an alert sound is sent upon receipt of a new message; a visual alert such as flashing is sent upon receipt of a user message. Accordingly, not notifying in real time means that no notification information corresponding to a real-time notification is sent.

Each filtering identifier may include, but is not limited to, characters, graphics, etc. Each filtering identifier is used to characterize a set of sessions that meet the filtering condition corresponding to that filtering identifier. As schematic illustration, a filtering identifier may include, for example, a real-time notification filtering identifier for indicating that new messages of the session are notified in real time; a mute notification filtering identifier that indicates new messages of the session are not notified in real time; an unprocessed filtering identifier for indicating a message to be processed, etc.

Sessions of the user may be filtered by filtering conditions corresponding to the respective filtering identifiers, so that a plurality of sessions of the user may be divided into different groups. Each session of the user may be associated with a filtering identifier corresponding to the session. Each filtering identifier may correspond to at least one session that meets the filtering identifier.

In the message page, the user may use, through a selection operation to filtering identifiers displayed in the first display area, a filtering identifier indicated by the selection operation as the currently selected filtering. The selected filtering identifier may be used as the first filtering identifier.

Information of a session corresponding to the selected first filtering identifier is displayed in the preset display area of the message page. Where the preset display area and the first display area are located in the same message page, the preset display area may be other area than the first display area in the message page. In some application scenarios, the first display area may be located at the top of the message page, or below the first display area.

In the preset display area, information of the session corresponding to the first filtering identifier is displayed. For example, information of a plurality of sessions corresponding to the first filtering identifier is displayed in the form of a list.

Information of a session corresponding to the first filtering identifier may, for example, include but is not limited to the session identifier, session name, summary information of the latest message of each session, and time information when the latest message was received.

At step 103, in response to a message of a session corresponding to the second filtering identifier satisfying the preset condition, the information of the session is displayed in the preset display area. The second filtering identifier is a filtering identifier other than the first filtering identifier.

The second filtering identifier here may be any other filtering identifier that the first filtering identifier.

Since the second filtering identifier is not the currently selected filtering identifier, if messages of the session corresponding to the second filtering identifier do not meet the preset condition, they may not be displayed in the preset display area.

When a message of the session corresponding to the second filtering identifier meets the preset condition, the information of the session may be displayed in the preset display area. At this point, the preset display area may still mainly display information of a plurality of sessions corresponding to the first filtering identifier.

That is, when the preset display area displays the information of the session corresponding to the first filtering identifier, after an incoming new message of the session corresponding to the second filtering identifier meets the preset condition, the information of the session may be transmitted to the preset display area transparently, so that the new message may be displayed in time.

In some optional implementations, the preset condition includes, but is not limited to, at least one of the following: the message carries a preset identifier; the message is sent by a preset contact; the message content is related to a preset topic.

The preset identifier may be located in a preset location of the message, e.g., in the header of the message. The preset identifier includes, but are is limited to, characters for indicating specified users to which the message is to be sent and/or characters for indicating that the message requires prioritized processing. When the session is a group session, the specified users include, but are not limited to, any user in the group session, and all users in the group session. The characters for indicate specified users to which the message is to be sent may comprise any character that characterizes directed sending, which is not limited here.

The characters for indicating that the message requires prioritized processing may be any character for characterizing premium processing of the message, which is not limited here.

The preset contact may be any contact specified in advance. In this way, messages information related to the specified contact may be notified in time to avoid the delay messages of the specified contact.

Whether the message content is related to the preset topic may be determined by determining whether the message content comprises a preset keyword related to the preset topic. When the message content comprises the preset keyword, the message content may be considered related to the preset topic, otherwise it may be considered irrelevant.

Messages that meet the preset condition are usually messages that need to be notified to users in time. The session information corresponding to the messages satisfying the preset condition is displayed in the preset display area, the requirement of notifying users of these messages in time may be met.

In some optional implementations, the method for information display further comprises the steps of: providing a configuration page, which is used for configuring any one or more of the preset identifiers, preset contacts, and preset topics.

The user may set the preset condition in the configuration page, e.g., sets a preset identifier as the preset condition in the configuration page. As an example, the preset identifier here can be the character "@" used to indicate that the message is to be sent to the specified user. As another example, a user identifier corresponding to the preset contact is set as the preset condition in the configuration page. As a further example, keywords related to the preset topic are entered in the configuration page, so that the preset topic is used as the preset condition.

By providing the configuration page, it is convenient for users to set or change the preset condition.

In some optional implementations, the information of the session displayed within the preset display area includes at least one of the following: identification information for the session to which the message belongs, information for characterizing the second filtering identifier, information satisfying the predetermined condition, and information for characterizing the time when the message was generated or received. In some implementations, the information of the session displayed in the preset display area may further include summary information of the message.

By displaying the identification information of the session to which the message belongs, it is made convenient for the user to learn a source corresponding to the message. The information for characterizing the second filtering identifier may include, for example, text information, graphic information, or image information. The above information enables the user to clearly understand that the filtering identifier corresponding to the message is the second filtering identifier.

It should be noted that the second filtering identifier may be any filtering identifier other than the first filtering identifier, or it may be a filtering identifier other than the first filtering identifier within a preset range, which is not limited here.

The predetermined condition includes the preset condition.

The predetermined condition may be, for example, a preset condition which the message satisfies. It can also be other conditions that are set, for example, that the number of characters included in the message exceeds a preset character threshold.

Displaying information of the above predetermined condition may help the user understand key information of the new message and judge the importance of the new message.

In some application scenarios, the predetermined condition may be, for example, a preset identifier carried by the message, and then information of the session displayed in the preset display area may comprise the preset identifier. The preset identifier may include, for example, characters for indicating specified users to which the message is to be sent and/or characters for indicating that the message requires prioritized processing.

In some application scenarios, for example, the preset condition may be that the message is sent by a preset contact, and then information of the session displayed in the preset display area may include an identifier of the preset contact.

In some application scenarios, for example, preset condition may be that the message content is related to the preset topic, and then information of the session displayed in the preset display area may include information of the preset topic. The information of the preset topic includes preset keywords corresponding to the preset topic.

The time information of the session displayed in the preset display area may not be the time information of the latest message received by the session. The time information of the session displayed in the preset display area may be information of the generating time or receiving time of the message that meets the preset condition. The information of the generated time of the message includes but is not limited to the time when the message was sent. By displaying the generating time or receiving time of the message, it is convenient for the user to learn from the preset display area the occurrence time of the message of the session that meets the preset condition, so that the user can process the new message of the session accordingly.

In the present embodiment, an execution subject of the method for information display may be the user's terminal device, a communication client such as an instant messaging client installed on the user's terminal device, or the server side. The instant messaging client may include a client with an instant messaging function. For example, client applications for browsing short videos or graphic information, if having an instant messaging function, also belong to instant messaging clients of the present disclosure.

Figure 2A:
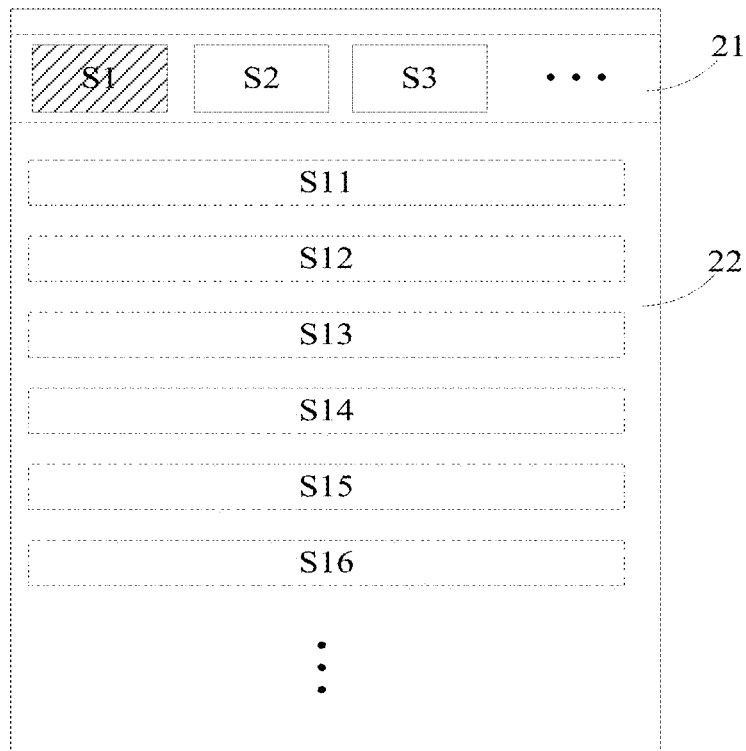
FIG. 2A-FIG. 2B are schematic diagrams of some application scenarios of the method for information display provided by the present disclosure.
Figure 2B:
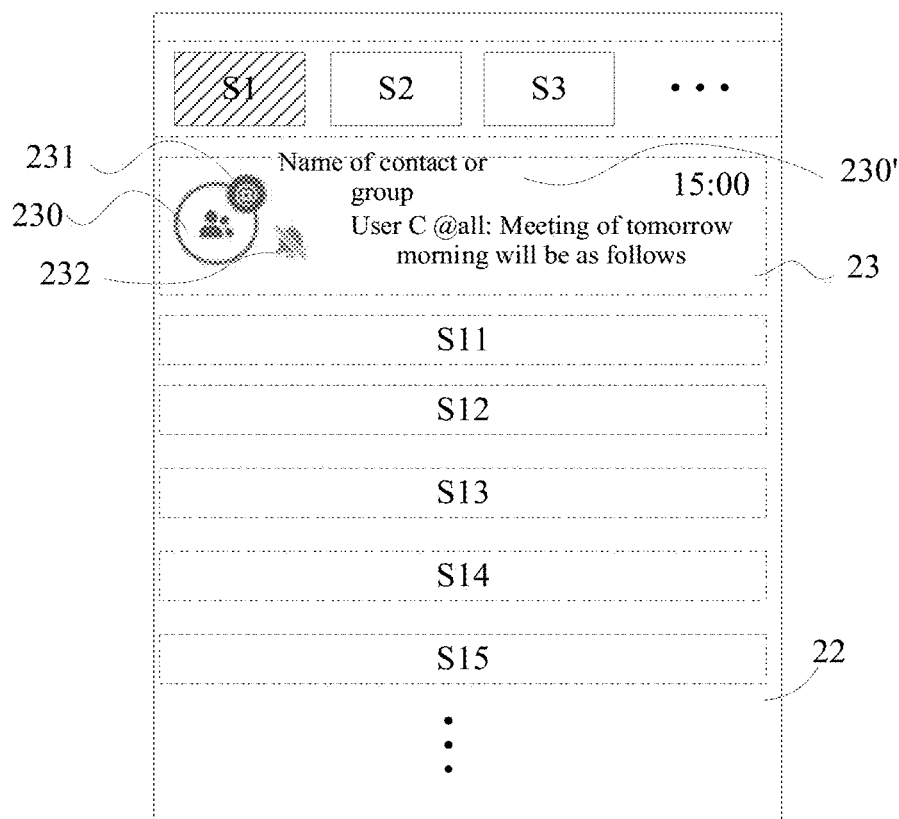

Reference are made to FIGS. 2A and 2B, which show schematic diagrams of some application scenarios of a method for information display provided by the present disclosure.

In this application scenario, session filtering identifiers and information of a plurality of sessions corresponding to the currently selected session filtering identifier may be displayed in the same message page. In this message page, filtering identifiers are displayed in the first display area 21; information of sessions corresponding to the currently selected filtering identifier (the first filtering identifier) may be displayed in the preset display area. In this application scenario, the preset display area is the second display area 22 of the message display page, as shown in FIG. 2A.

The first display area 21 may display at least two filtering identifiers, such as S1, S2 and S3 as shown in FIG. 2A. It should be noted that S1, S2, S3 here are only schematic filtering identifiers. In practice, the filtering identifiers may include text, symbols, etc.

Each filtering identifier corresponds to one preset filter condition. Each filtering identifier corresponds to at least one session that meets that preset filtering condition.

The user may select any filtering identifier as the currently selected filtering identifier in the first display area 21, and information of sessions of the currently selected filtering identifier is displayed in the second display area 22. As shown in FIG. 2A, the currently selected filtering identifier is S1. First, S1 is used as the first filtering identifier. A portion of the message page is illustrated in FIG. 2A.

Information of sessions corresponding to the first filtering identifier S1 is displayed in the second display area 22. The message page here may be a message page of a preset instant messaging application or a message page of other web pages.

The information of sessions corresponding to the first filtering identifier S1 displayed in the second display area 22 comprises S11, S12, S13, S14, S15 and S16. Information of each session may include the session identifier. The session identifier includes a graphic identifier and a text identifier. The session identifier is used to distinguish between different sessions. In some application scenarios, the session identifier comprises a user identifier of the contact. The session information may also include brief information about a recently received message and information of the generating time or receiving time of the latest message.

Where a new message of a session is received, if the session to which the new message belongs is a session corresponding to a filtering identifier other than the currently selected first filtering identifier, if the new message does not meet the preset condition, the information of the session is not displayed in the second display area. If the new message meets the preset condition, the information of the session to which the new message belongs may be displayed in the second display area. The filtering identifier corresponding to the session to which the new message belongs may be marked as the second filtering identifier, and as shown in FIG. 2B, the information 23 of the session to which the new message belongs is displayed in the second display area 22. The information 23 for the session to which the new message belongs may include at least one of: information for characterizing the second filtering identifier, information for characterize a predetermined condition that the message meets, summary information of the message, and information for characterizing the generating time or receiving time of the message. As an example, with reference to FIG. 2B, the information 23 for the session to which the new message belongs may include:

an identifier for characterizing the session to which the new message belongs, including a name 230 of the session's contact or group, and a graphic or image identifier 230 of the session;

information 232 for characterizing the filtering identifier corresponding to the session, time information for characterizing the generating time or receiving time of the message (e.g., 15:00 shown in FIG. 2B), summary information of the message (e.g., "User C @all: Meeting of tomorrow morning will be as follows" shown in FIG. 2B); and information for characterizing the preset condition met by the new message, herein the preset condition may be, for example, that the new message includes a preset identifier and the user sending the new message is a specified contact, the new message including specified keywords. When displaying the information of the preset condition met by the new message, the preset identifier, the specified contact and/or the keywords contained in the new message may be displayed. Thus, by displaying the preset condition information, the user may understand the reason why the message is transparently transmitted to the current session list, so as to facilitate the user to identify important information, reduce operating costs and improve communication efficiency. As shown in FIG. 2B, the information 23 of the session to which the new message belongs includes a preset identifier "@" 231 to indicate the directed delivery of the new message, for example, the new message is a message @ all or a message @ me. In addition, the information 23 for the session to which the new message belongs includes information indicating that the filtering identifier corresponding to the session is the second filtering identifier S2, such as graphic information 232 for identifying the second filtering identifier in FIG. 2B. The graphic information 232 may include, for example, a graphic indicating that a newly received message is not to be notified in real time, such as a bell with a slash as shown in FIG. 2B. That is, in FIG. 2B, the bell with a slash is used to indicate the second filtering identifier S2.

In a related technique, a plurality of sessions of a user can be grouped. The user may select a group of sessions for display at the same moment. That is, information of sessions corresponding to a plurality of session groups cannot be simultaneously displayed, or session information of some session groups cannot be displayed on the current display page. Sessions in a session group that is not displayed might have messages that need to be processed in time. When the sessions of the selected session group are displayed, since messages of sessions of other session groups cannot be displayed, the messages of other session groups cannot be processed in time.

With the method for information display provided in the present embodiment, at least two session filtering identifiers are displayed in the first display area of the message page, the session corresponding to each session filtering identifier satisfying a filtering condition corresponding to the session filtering identifier; information of respective sessions corresponding to the first filtering identifier is displayed in the preset display area of the message page, the first filtering identifier being the currently selected filtering identifier; in response to the message of a session corresponding to the second filtering identifier satisfying the preset condition, the information of the session is displayed in the preset display area, the second filtering identifier being a filtering identifier other than the first filtering identifier. In this way, it can achieve transparent passing of messages that satisfy pre-defined conditions between different filtering identifiers. In the scenario that sessions are grouped according to different filtering conditions and sessions corresponding to the selected group are displayed on the message display page, the solution makes it possible that messages satisfying the preset condition under the currently unselected filtering identifiers may be displayed in time. It may be avoided that important messages are delayed because the information of sessions under other filtering identifiers is not checked in time.

In some optional implementations of the present embodiment, the method further comprises at least one of the following: if other new messages for the session are received after the message, and the further new message does not meet the preset condition, maintaining the information for the session displayed in the preset display area unchanged; or, if other new messages for the session are received after the message, and the further new message meets the preset conditions, updating the information for the session displayed in the preset display area according to the further new message that meets the preset condition.

If the session subsequently receives a further new message(s) subsequent to the message, but the further new message(s) does not meet the preset condition, the information of the session displayed in the preset display area is still the information of the session corresponding to the messages satisfying the preset condition.

If the session receives a further new message(s) subsequent to the message, and the further new message(s) of this session meet the preset condition, then the session information may be updated in the preset display area. A summary of the other new messages may be learned from the updated session information, so that the processing time of the other new messages may be determined.

The session information displayed in the preset display area may comprise a summary of a message satisfying the preset condition, and the generating time or receiving time of the message satisfying the preset condition.

In these optional implementations, it is convenient for the user to learn from the preset display area the occurrence time of the message of the session that meets the preset condition, so that the user may determine the time and policy for processing the message according to the generating time or receiving time of the message.

Figure 3:
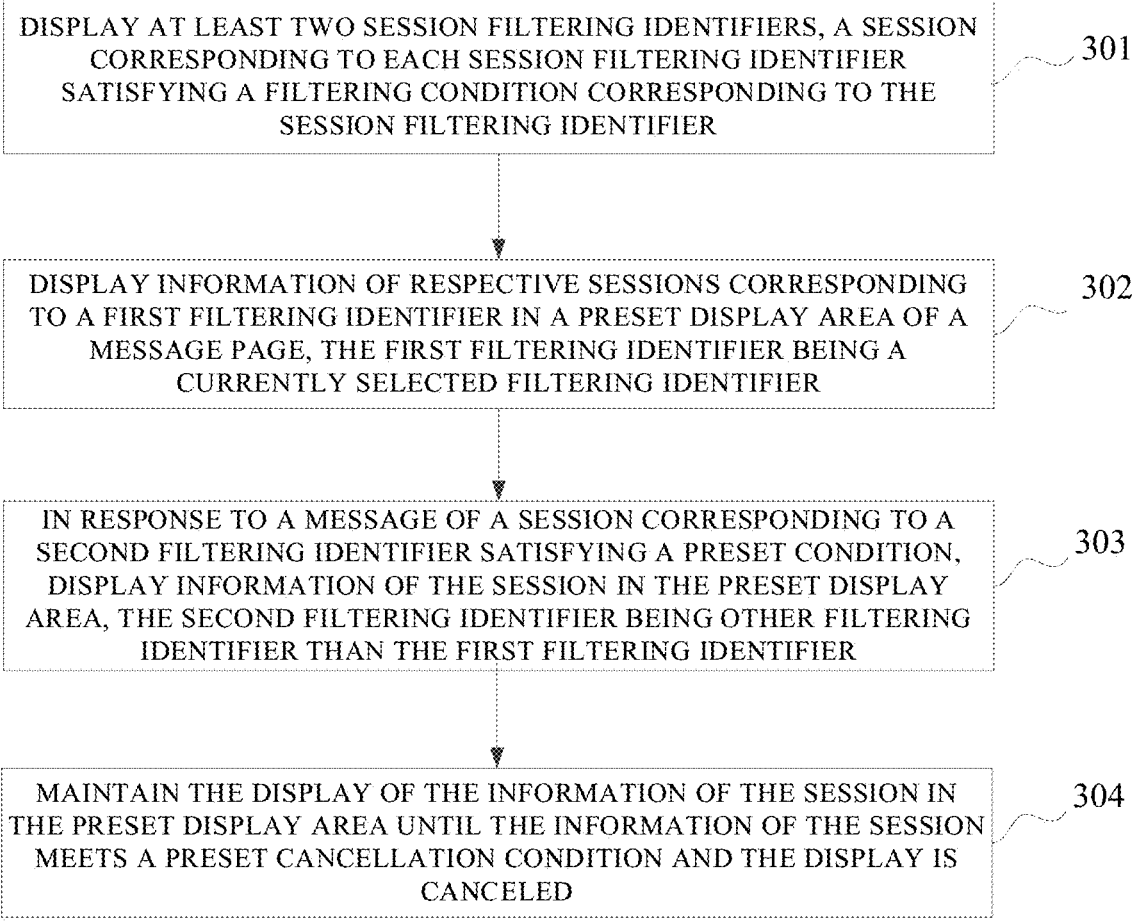
FIG. 3 is a flowchart of a method for information display according to some other embodiments of the present disclosure.

Reference is still made to FIG. 3, which shows a flowchart of a method for information display provided by some other embodiments of the present disclosure.

As shown in FIG. 3, the method for information display comprises the following.

At step 301, at least two session filtering identifiers are displayed, herein the session corresponding to each session filtering identifier meets a filtering condition corresponding to the session filtering identifier.

At step 302, the information of each session corresponding to a first filtering identifier is displayed in a preset display area of the message page, herein the first filtering identifier is a currently selected filtering identifier.

At step 303, in response a message of a session corresponding to a second filtering identifier satisfying a preset condition, the information of the session is displayed in the preset display area, herein the second filtering identifier is a filtering identifier other than the first filtering identifier.

The specific implementation of steps 301 to 303 may be the same as or similar to that of steps 101 to 103 of the embodiment shown in FIG. 1, which is not described in detail here.

At step 304, the display of the information of the session is maintained in the preset display area until the information of the session meets a preset cancellation condition and the display is canceled.

That is, when no other new messages are received, or new messages received later do not meet the preset condition, the information of the session satisfying the preset condition may be kept displayed in the preset display area.

In the present embodiment, at least two filtering identifiers may be displayed in the first display area. Each filtering identifier corresponds to at least one session.

The preset display area displays information of sessions corresponding to the first filtering identifier. The first filtering identifier is the currently selected filtering identifier. The second filtering identifier may be a filtering identifier other than the first filtering identifier.

When a message of a session corresponding to the second filter ID meets the preset condition, information of the session may be displayed in the preset display area so that users may learn about the message in timer.

In order to avoid the information of the session corresponding to the second filtering identifier from interfering with the information of the session corresponding to the first filtering identifier which is displayed in the preset display area, the information of the session is no longer displayed in the preset display area when the information of the session meets the preset cancellation condition.

The preset cancellation condition includes but is not limited to one of the following: the message is processed; the duration after the message is processed is longer than a preset duration; after the new message is processed, a page content switch operation is received so that the current page does not display the session.

The message being processed comprises the message being read or being replied to. Specifically, whether the message was read is determined by detecting whether the user performed a reading operation to read the message; whether the message is replied to is determined by detecting whether the user performed a reply operation to reply to the message.

In some other application scenarios, the preset cancellation condition is that the duration after the new message is processed is longer than the preset duration. If the duration after the new message is processed is longer than the preset duration, the display of the session information may be canceled in the preset display area. The preset duration can be 3 minutes, 5 minutes, etc. By extending the display time after the new message has been processed, users may check whether the message has been mishandled.

In some other application scenarios, the preset cancellation condition is that after the new message is processed, the page content switch operation is received so that the current page does not display the session. In other words, after the new message is processed, displayed content is switched, and the information of the session may be canceled in the preset display area.

Further, the page content switch operation includes one of the following: scrolling the session feed stream; filtering identifier switch; switching to another page in the instant messaging application; closing an instant messaging application used to host the message page and reopening the instant messaging application.

Information about other sessions can be displayed by scrolling through the session feed stream by the user, and the session is scrolled out of the display page due to the limited size of the page.

The filtering identifier switch is that the user selects a filtering identifier other than the first filtering identifier as the currently selected filtering identifier. Through the filtering identifier switch, information of a session corresponding to the currently selected filtering identifier is displayed in the preset display area. It should be noted that in some embodiments: if the second filtering identifier is switched to, the session will be displayed normally in the session stream of the second filtering identifier because the session originally belongs to the second filtering identifier; a filtering identifier other than the first filtering identifier and the second filtering identifier is switched to, the session will not be displayed. Further, if the first filtering identifier is switched back to after switching to another filtering identifier, the session is no longer displayed in the session stream corresponding to the first filtering identifier in the preset display area.

Other pages of the instant messaging application are switched to, for example, other main navigation items in the instant messaging application such as calendar, document, and mailbox are selected, and information corresponding to the other selected main navigation items is displayed. After switching to a further page of the instant messaging application, the information about the session is no longer displayed on the page.

If the message of the session meets the preset cancellation condition, it means that the user has browsed the new message and will subsequently process other information. The display of the session information may be canceled in the preset display area to avoid interference with information of the currently selected filtering identifier caused by the continued display of the session information in the preset display area.

Compared with the embodiments shown in FIG. 1, the method for information display provided in these embodiments highlights the step of canceling the information of the session to which the message satisfying the preset condition belongs in the preset display area. The solution provided by the present embodiment avoids the problem of interference caused by the continued display of the information of the session in the preset display area.

In some optional implementations, the method for information display of the embodiments shown in FIG. 1 and FIG. 3 further comprises: presenting at least one message of the session, including the message, according to a preset operation performed by the user to display the information of the session in the preset display area.

In these optional implementations, at least one message of the session may be presented in the preset display area or in a third display area outside the preset display area, the at least one message including the message. In this way, the user may display the session's information in the preset display area that originally displayed the session list of the first filtering identifier without the need of switching the filtering identifier. User switching operations are reduced.

Further, optionally, the message is highlighted.

The highlighting comprises at least one of the following: a display style of the message being different from a display style of other messages; a background color of an area in which the message is located is different from a background color of other areas.

The display style comprises a character size, a character bold display, a font, and so on.

Highlighting the message helps users quickly find the message among a plurality of messages.

In some optional implementations, when there are more than two messages that meet the preset condition, the method for information displays further comprises: after a message satisfying the preset condition is processed, automatically jumping to a next message that meets the preset condition.

The message being processed may include but is not limited to the message being read and replied to.

The automatically jumping to a next message that meets the preset condition comprises cursor jump, highlighted jump, etc.

When there are more than two messages that meet the preset condition, with the above optional implementations, automatic adjustment between different messages that meet the preset condition may be realized, so that users may quickly browse more than two messages that meet the preset condition.

Figure 4:
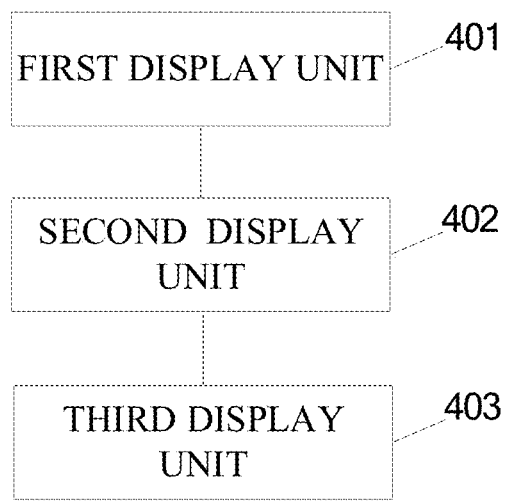
FIG. 4 is a structural diagram of an apparatus for information display in accordance with some embodiments of the present disclosure.

With further reference to FIG. 4, the present disclosure provides an embodiment of an apparatus for information display. The part of the apparatus embodiment related to the method embodiment shown in FIG. 1 is not detailed here. The apparatus may be specifically applied to various electronic devices.

As shown in FIG. 4, the apparatus for information display of the present embodiment comprises: a first display unit 401, a second display unit 402, and a third display unit 403. Herein, the first display unit 401 is configured to display at least two session filtering identifiers, a session corresponding to each session filtering identifier satisfying a filtering condition corresponding to the session filtering identifier; the second display unit 402 is configured to display information of respective sessions corresponding to a first filtering identifier in a preset display area of a message page, the first filtering identifier being a currently selected filtering identifier; the third display unit 403 is configured to, in response to a message of a session corresponding to a second filtering identifier satisfying a preset condition, display information of the session in the preset display area, the second filtering identifier being other filtering identifier than the first filtering identifier.

In the present embodiment, for the specific processing of the first display unit 401, the second display unit 402 and the third display unit 403 of the apparatus for information display and the technical effects brought by them, reference may be made to the relevant descriptions of steps 101, 102 and 103 in the corresponding embodiment in FIG. 1 respectively, which is not detailed here.

In some optional implementations, the first display unit 401 is further configured to: display at least two session filtering identifiers in a first display area of the message page; the preset display area is a second display area of a message page; the first display area and the second display area are located in the same or different message pages.

In some optional implementations, the preset condition comprises at least one of the following: the message carries a preset identifier; the message is sent by a preset contact; the message content is related to a preset topic.

In some optional implementations, the preset identifier comprises: characters for indicating a specified user to whom a message is to be sent and/or characters for indicating that the message requires prioritized processing.

In some optional implementations, a configuration page is provided, the configuration page being configured to configure any one or more of the preset identifier, the preset contact, and the preset topic.

In some optional implementations, the information of the session displayed in the preset display area comprises at least one of the following: identification information of the session to which the message belongs, information for characterizing the second filtering identifier, information satisfying a predetermined condition, and information for characterizing a time when the message was generated or received.

In some optional implementations, the predetermined condition comprises the preset condition.

In some optional implementations, the third display unit 403 is further configured to: in accordance with a determination that a further new message of the session is received after the message and the further new message does not meet the preset condition, maintain the information of the session displayed in the preset display area unchanged; or, in accordance with a determination that a further new message of the session is received after the message and the further new message meets the preset condition, update the information of the session displayed in the preset display area according to the further new message that meets the preset condition.

In some optional implementations, the third display unit 403 is further configured to: maintain the display of the information of the session in the preset display area until the information of the session meets a preset cancellation condition and the display is canceled.

In some optional implementations, the preset cancellation condition comprises one of the following: the message is processed; a duration after the message has been processed is longer than a preset duration; and after the new message is processed, a page content switch operation is received such that the session is not displayed in a current page.

In some optional implementations, the page content switch operation comprises one of the following: filtering identifier switching; switching to a further page of an instant messaging application; closing an instant messaging application which hosts the message page and reopening the instant messaging application.

In some optional implementations, the third display unit 403 is further configured to: in response to an instruction received within the preset display area to display the information of the session, display at least one message of the session, the at least one message including the message.

In some optional implementations, the third display unit 403 is further configured to: highlight the message.

In some optional implementations, the highlighting comprises at least one of the following: a display style of the message being different from a display style of other messages; a background color of an area in which the message is located is different from a background color of other areas.

In some optional implementations, the third display unit 403 is further configured to: where there are more than two messages satisfying the preset condition, after processing one of the messages satisfying the preset condition, automatically jump to a next message satisfying the preset condition.

Figure 5:
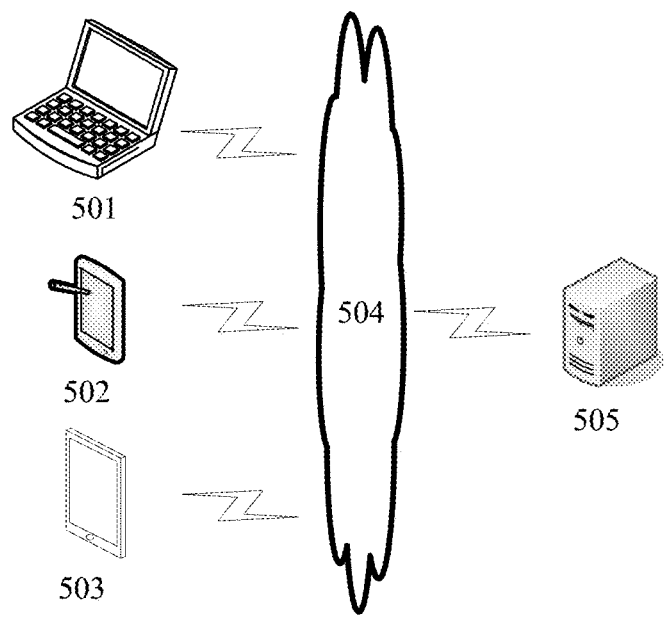
FIG. 5 is an example system architecture to which a method for information display of an embodiment of the present disclosure may be applied.

Reference is made to FIG. 5, which shows an example system architecture to which a method for information display of an embodiment of the present disclosure may be applied.

As shown in FIG. 5, the system architecture may include terminals 501, 502, 503, a network 504, and a server 505. The network 504 is used to provide media of communication links between the terminals 501, 502, 503 and the server 505. The network 504 may include various connection types, such as wired, wireless communication links, or fiber optic cables.

The terminals 501, 502, and 503 may interact with the server 505 through the network 504 to receive or send messages, etc. On the terminals 501, 502, 503 may be installed a variety of client applications, such as web browser applications, search applications, news and information applications. The client application in the terminals 501, 502, and 503 may receive user instructions and perform corresponding functions according to the user instructions, such as adding corresponding information to the information according to the user instructions.

The terminals 501, 502, 503 may be hardware or software. When the terminals 501, 502, 503 are hardware, they may be various terminal devices with a display screen and supporting web browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers, etc. When the terminals 501, 502, 503 are software, they may be installed in the above listed electronic devices, and may be implemented as a plurality of software or software modules (such as software or software modules for providing distributed services) or as a single software or software module. It is not intended to limit in this regard.

The server 505 may provide various services, such as receiving information sent by the terminals 501, 502, 503 and forwarding the information to other terminals.

It should be noted that the method for information display provided in the embodiments of the present disclosure may be executed by the terminal, and accordingly, the apparatus for information display may be arranged in the terminals 501, 502, 503. In addition, the method for information display provided by the embodiments of the present disclosure may also be executed by the server 505, and accordingly, the apparatus for information display may be arranged in the server 505.

It should be understood that the number of terminals, networks, and servers shown in FIG. 5 is only schematic.

Depending on practical needs, any number of terminals, networks, and servers may be provided.

The present disclosure further provides an electronic device, comprising: one or more processors, and a memory device for storing one or more programs; the one or more programs, when executed by the one or more processors, cause the one or more processors to implement the method for information display in the present disclosure.

Figure 6:
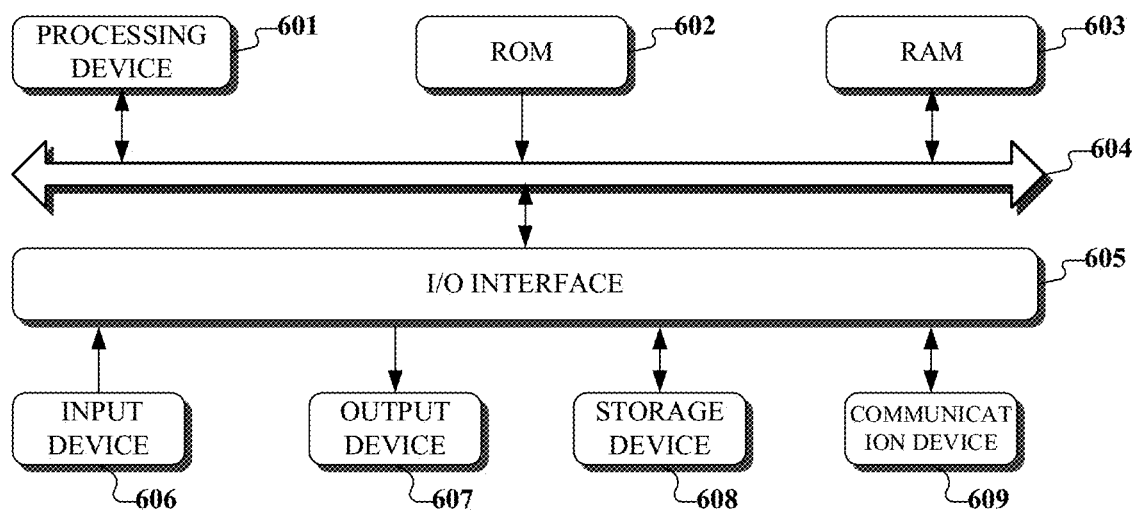
FIG. 6 is a schematic diagram of the basic structure of an electronic device provided in accordance with some embodiments of the present disclosure.

Reference is made to FIG. 6 below, which shows a structural schematic diagram of an electronic device suitable for implementing the embodiments of the present disclosure. The electronic device here generally refers to a terminal or server (e.g., the terminal device or server in FIG. 5) in hardware form. The terminal device in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 6 is merely an example and should not be construed to impose any limitations on the functionality and use scope of the embodiments of the present disclosure.

As shown in FIG. 6, the electronic device may comprises processing device (e.g., a central processor, a graphics processor) 601 which is capable of performing various appropriate actions and processes in accordance with programs stored in a read only memory (ROM) 602 or programs loaded from storage device 608 to a random access memory (RAM) 603. In the RAM 603, there are also stored various programs and data required by the electronic device 600 when operating. The processing device 601, the ROM 602 and the RAM 603 are connected to one another via a bus 604. An input/output (I/O) page 605 is also connected to the bus 604.

Usually, the following devices may be connected to the I/O page 605: an input device 606 including a touch screen, a touch pad, a keyboard, a mouse, a camera, a microphone, an accelerometers, a gyroscope, or the like; an output device 607, such as a liquid-crystal display (LCD), a loudspeaker, a vibrator, or the like; a storage device 608, such as a magnetic tape, a hard disk or the like; and a communication device 609. The communication device 609 allows the electronic device 600 to perform wireless or wired communication with another device so as to exchange data with the other device. While FIG. 6 shows the electronic device 600 with various device, it should be understood that it is not required to implement or have all of the illustrated device. Alternatively, more or less device may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication device 609, or installed from the storage device 608, or installed from the ROM 602. The computer program, when executed by the processing device 601, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (HyperText Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The above computer readable medium carries one or more programs which, when executed by the electronic device, cause the electronic device to: display at least two session filtering identifiers, and a session corresponding to each session filtering identifier meets a filtering condition corresponding to the session filtering identifier; display information of respective sessions corresponding to a first filtering identifier in a preset display area of a message page, the first filtering identifier being a currently selected filtering identifier; in response to a message of a session corresponding to a second filtering identifier satisfying a preset condition, display information of the session in the preset display area, the second filtering identifier being other filtering identifier than the first filtering identifier.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example, and in a non-limiting sense, example types of hardware logic components that can be used may include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the particular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in a plurality of embodiments, either individually or in any suitable sub-combinations.

While the present subject matter has been described using language specific to structural features and/or method logic actions, it should be understood that the subject matter defined in the appended claims is not necessarily limited to the particular features or actions described above. On the contrary, the particular features and actions described above are merely example forms of realizing the claims. With respect to the apparatus in the above embodiment, the specific manner in which each module performs an operation has been described in detail in the embodiments relating to the method, and will not be detailed herein.

We claim:

1. A method for information display, comprising:
    displaying at least two session filtering identifiers, a session corresponding to each session filtering identifier satisfying a filtering condition corresponding to the session filtering identifier;
    in response to determining that a first filtering identifier is selected, displaying information of respective sessions corresponding to the first filtering identifier in a preset display area of a message page; and
    in response to receiving a message of a session corresponding to a second filtering identifier satisfying a preset condition and in response to determining that the second filtering identifier is not selected, displaying information of the session in the preset display area with the information of respective sessions corresponding to the selected first filtering identifier, the second filtering identifier being other filtering identifier than the selected first filtering identifier, the preset condition being different from a filtering condition corresponding to the first session filtering identifier.

2. The method of claim 1, wherein,
    the displaying at least two session filtering identifiers comprises: displaying at least two session filtering identifiers in a first display area of the message page;
    the preset display area is a second display area of a message page; and
    the first display area and the second display area are located in the same or different message pages.

3. The method of claim 1, wherein the preset condition comprises at least one of the following:
 the message carries a preset identifier;
 the message is sent by a preset contact; or
 the message content is related to a preset topic.

4. The method of claim 3, wherein the preset identifier comprises: characters for indicating a specified user to whom a message is to be sent, and/or characters for indicating that the message requires prioritized processing.

5. The method of claim 3, wherein the method further comprises:
 providing a configuration page, the configuration page being used to configure any one or more of: the preset identifier, the preset contact, and the preset topic.

6. The method of claim 1, wherein,
 the information of the session displayed in the preset display area comprises at least one of the following:
 identification information of the session to which the message belongs, information for characterizing the second filtering identifier, information satisfying a predetermined condition, and information for characterizing a time when the message was generated or received.

7. The method of claim 6, wherein,
 the predetermined condition comprises the preset condition.

8. The method of claim 1, wherein the method further comprises at least of the following:
 in accordance with a determination that a further new message of the session is received after the message and the further new message does not meet the preset condition, maintaining the information of the session displayed in the preset display area unchanged;
 or, in accordance with a determination that a further new message of the session is received after the message and the further new message meets the preset condition, updating the information of the session displayed in the preset display area according to the further new message that meets the preset condition.

9. The method of claim 1, wherein the method further comprises:
 maintaining the display of the information of the session in the preset display area until the information of the session meets a preset cancellation condition and the display is canceled.

10. The method of claim 9, wherein the preset cancellation condition comprises one of the following:
 the message is processed;
 a duration after the message has been processed is longer than a preset duration; or
 after the new message is processed, a page content switch operation is received such that the session is not displayed in a current page.

11. The method of claim 10, wherein the page content switch operation comprises one of the following:
 scrolling a session feed stream;
 filtering identifier switching;
 switching to a further page of an instant messaging application; or
 closing an instant messaging application which hosts the message page and reopening the instant messaging application.

12. The method of claim 1, wherein the method further comprises:
 in response to an instruction received within the preset display area to display the information of the session, displaying at least one message of the session, at least one message comprising the message.

13. The method of claim 12, wherein the method further comprises:
 highlighting the message.

14. The method of claim 13, wherein the highlighting comprises at least one of the following:
 a display style of the message being different from a display style of other messages; or
 a background color of an area in which the message is located is different from a background color of other areas.

15. The method of claim 12, wherein, in a case that there are more than two messages satisfying the preset condition, the method further comprises:
 after processing one of the messages satisfying the preset condition, automatically jumping to a next message satisfying the preset condition.

16. An electronic device, comprising:
 one or more processors; and
 a memory device for storing one or more programs;
 wherein the one or more programs, when executed by the one or more processors, cause the one or more processors to perform acts comprising:
 displaying at least two session filtering identifiers, a session corresponding to each session filtering identifier satisfying a filtering condition corresponding to the session filtering identifier;
 in response to a first filtering identifier being selected, displaying information of respective sessions corresponding to a first filtering identifier in a preset display area of a message page; and
 in response to receiving a message of a session corresponding to a second filtering identifier satisfying a preset condition and in response to determining that the second filtering identifier is not selected, displaying information of the session in the preset display area, the second filtering identifier being other filtering identifier than the selected first filtering identifier, the preset condition being different from a filtering condition corresponding to the first session filtering identifier.

17. The device of claim 16, wherein,
 the displaying at least two session filtering identifiers comprises: displaying at least two session filtering identifiers in a first display area of the message page;
 the preset display area is a second display area of a message page; and
 the first display area and the second display area are located in the same or different message pages.

18. The device of claim 16, wherein the preset condition comprises at least one of the following:
 the message carries a preset identifier;
 the message is sent by a preset contact; or
 the message content is related to a preset topic.

19. The device of claim 16, wherein the acts further comprise:
 maintaining the display of the information of the session in the preset display area until the information of the session meets a preset cancellation condition and the display is canceled.

20. A non-transitory computer readable storage medium having a computer program stored thereon, characterized in that the program, when executed by a processor, performs a method comprising:
 displaying at least two session filtering identifiers, a session corresponding to each session filtering identifier satisfying a filtering condition corresponding to the session filtering identifier;

in response to determining that a first filtering identifier is selected, displaying information of respective sessions corresponding to a first filtering identifier in a preset display area of a message page; and in response to receiving a message of a session corresponding to a second filtering identifier satisfying a preset condition and in response to determining that the second filtering identifier is not selected, displaying information of the session in the preset display area, the second filtering identifier being other filtering identifier than the selected first filtering identifier, the preset condition being different from a filtering condition corresponding to the first session filtering identifier.

* * * * *